US006914341B1

(12) United States Patent
McIntyre

(10) Patent No.: US 6,914,341 B1
(45) Date of Patent: Jul. 5, 2005

(54) ROTATIONAL INERTIA AIDED ELECTRIC GENERATOR

(76) Inventor: Stephen McIntyre, 1556 N. Oaks Ct., Ontario, CA (US) 91762-1050

( * ) Notice: Subject to any disclaimer, the term of this patent is extended or adjusted under 35 U.S.C. 154(b) by 75 days.

(21) Appl. No.: 10/630,205

(22) Filed: Jul. 29, 2003

(51) Int. Cl.$^7$ .................................................. H02J 7/00
(52) U.S. Cl. .............................. 290/9; 290/10; 180/65.1
(58) Field of Search ........................ 290/9, 10; 180/65.1

(56) References Cited

U.S. PATENT DOCUMENTS

| | | | | |
|---|---|---|---|---|
| 3,858,674 A | * | 1/1975 | Tabor ........................... | 180/165 |
| 4,024,926 A | * | 5/1977 | Butoi ........................... | 180/65.3 |
| 4,381,041 A | * | 4/1983 | Butoi ........................... | 180/65.3 |
| 4,405,028 A | * | 9/1983 | Price ........................... | 180/65.7 |
| 4,413,698 A | * | 11/1983 | Conrad et al. .............. | 180/305 |
| 4,477,764 A | * | 10/1984 | Pollard ........................ | 320/116 |
| 4,602,694 A | * | 7/1986 | Weldin ......................... | 180/2.2 |

FOREIGN PATENT DOCUMENTS

| | | | |
|---|---|---|---|
| DE | 19502961 A1 | * | 1/1995 |
| EP | 0441212 A2 | * | 8/1991 |
| FR | 2721265 A1 | * | 12/1995 |
| GB | 2270807 A | * | 3/1994 |
| JP | 08070570 A | * | 3/1996 |

* cited by examiner

Primary Examiner—Joseph Waks
(74) Attorney, Agent, or Firm—Dennis W. Beech

(57) ABSTRACT

The inertially aided electric generator may efficiently produce electrical energy. An electric generator may have a rotatable generator shaft with a first pulley attached. There may be a rotatable shaft having a shaft pulley attached and a shaft belt disposed on the first pulley and the shaft pulley. A second pulley may be attached to the generator shaft. A motor may have a rotatable motor shaft with a motor pulley attached and a motor belt may be disposed on the second pulley and the motor pulley. A power source may be in electrical communication with the motor.

19 Claims, 2 Drawing Sheets

ROTATIONAL INERTIA AIDED ELECTRIC GENERATOR

BACKGROUND OF THE INVENTION

This invention relates to apparatus or system for generation of electrical energy. The improved efficiency electric power generation apparatus includes the inertia of a rotating shaft to aid in powering an electric generator that may intermittently be powered by an electric motor.

Electric generators have been used for may years to produce electric power. The electric generators may be powered by internal combustion engines, water or hydroelectric, nuclear and other sources of power. The emphasis in contemporary applications, particularly for a small scale electrical generation such as for a land vehicle may have been to obtain efficient electric power generation for increased periods of use with a minimum of input energy to a generating system.

SUMMARY OF THE INVENTION

The present invention is directed to apparatus and systems for generation of electrical energy. An electric generator may have a rotatable generator shaft with a first pulley attached. There may be a rotatable shaft having a shaft pulley attached and a shaft belt disposed on the first pulley and the shaft pulley. A second pulley may be attached to the generator shaft. A motor may have a rotatable motor shaft with a motor pulley attached and a motor belt may be disposed on the second pulley and the motor pulley. A power source may be in electrical communication with the motor. These and other features, aspects and advantages of the present invention will become better understood with reference to the following drawings, description and claims.

DETAILED DESCRIPTION

The following detailed description represents the best currently contemplated modes for carrying out the invention. The description is not to be taken in a limiting sense, but is made merely for the purpose of illustrating the general principles of the invention.

Figure 1:
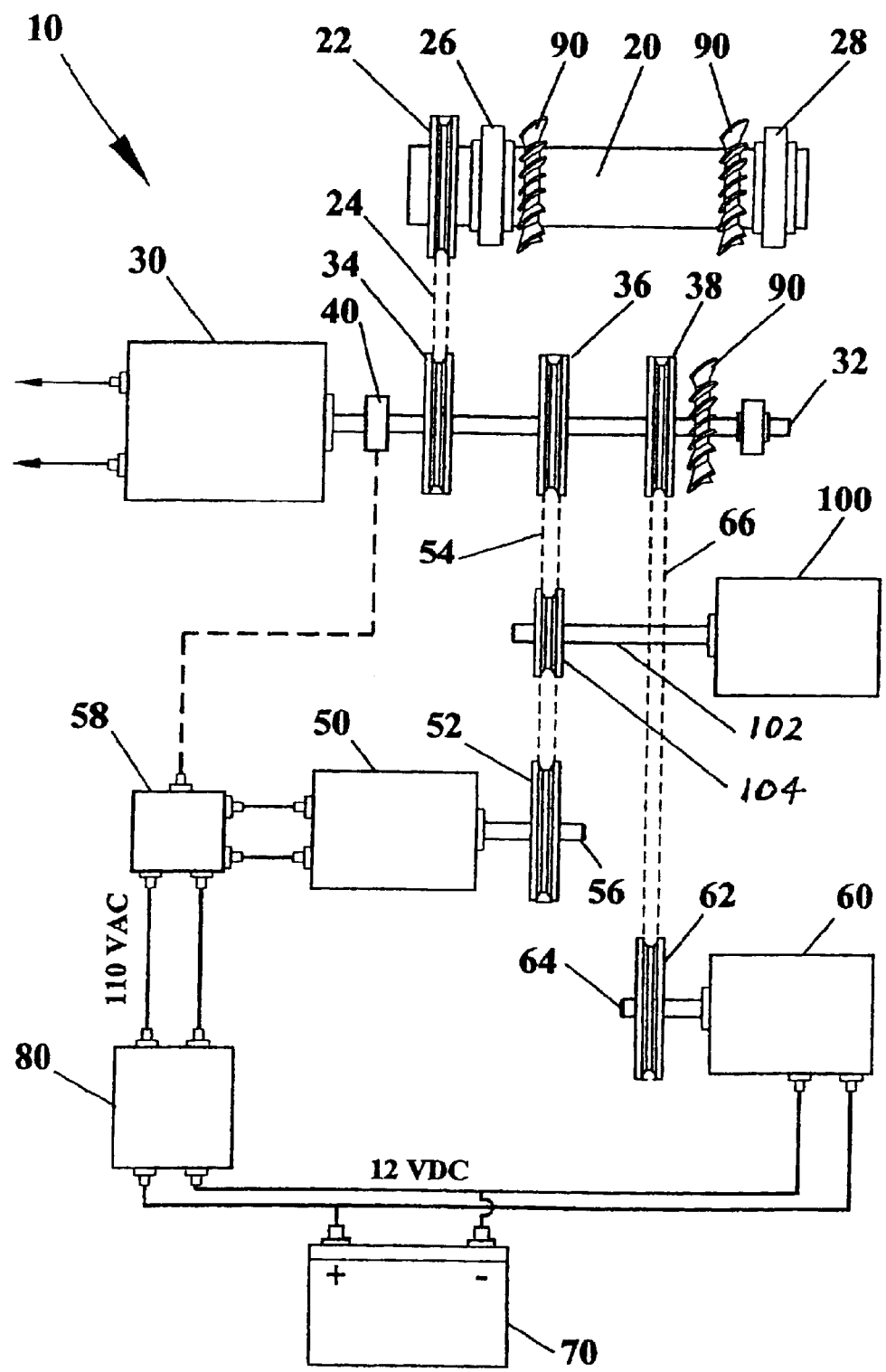
FIG. 1 illustrates a schematic view of the inertia aided electric generator according to an embodiment of the invention.
Figure 1A:
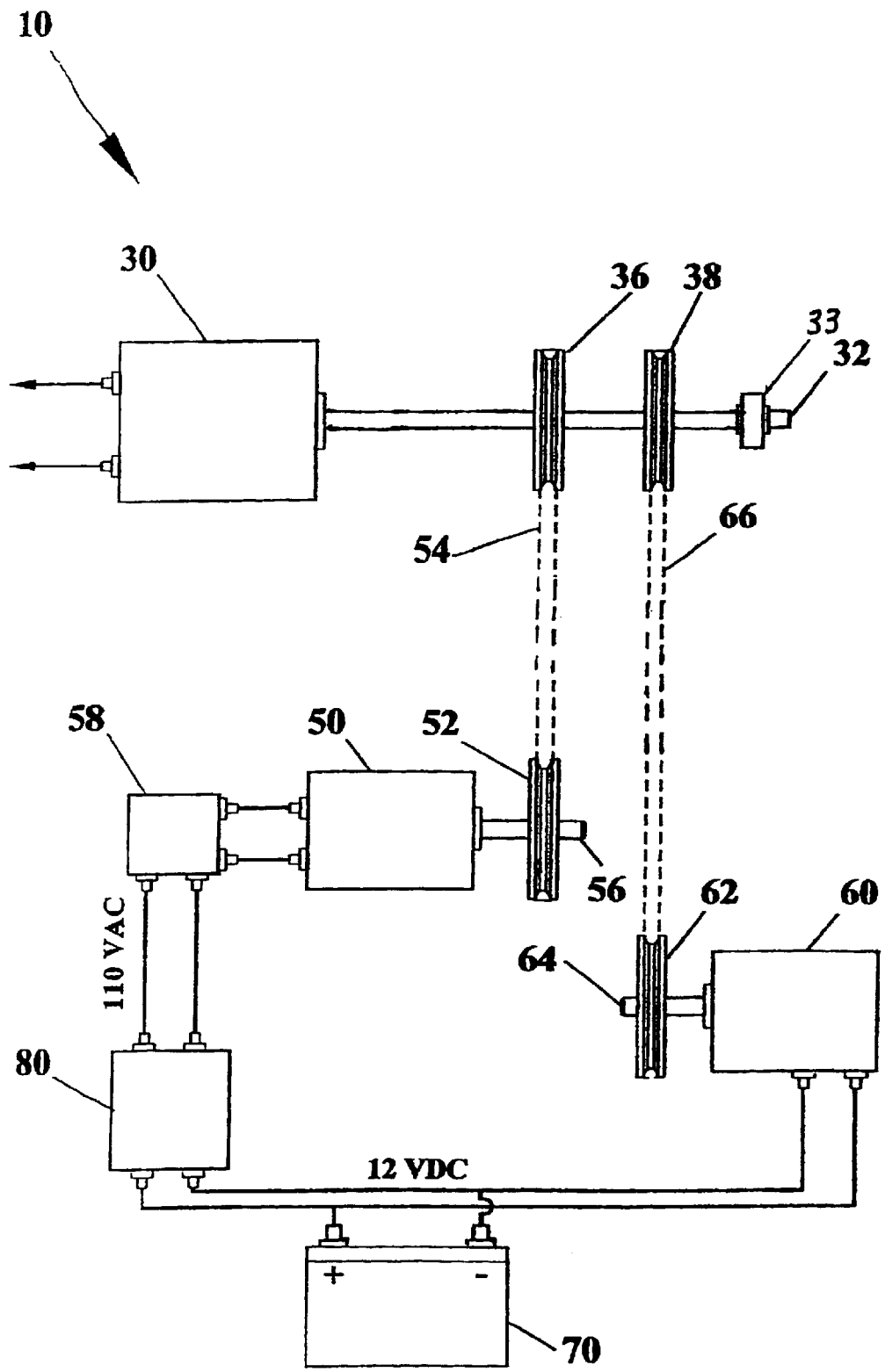

Referring to FIG. 1, the inertially aided electric generating system 10 may have an electric generator 30 with rotatable generator shaft 32 mechanically linked to a rotatable shaft 20 by a shaft pulley 22, a first pulley 34 and shaft belt 24. The rotatable shaft 20 may be mounted in bearings 26, 28.

The electric generator 30 may also be mechanically linked to a motor 50 by a second pulleys 36 and a motor pulley 52 on motor shaft 56. A motor belt 54 may be disposed on pulleys 36, 52. The electric generator 30 may be mechanically linked to an alternator 60 by a third pulley 38, an alternator pulley 62 on a rotatable alternator shaft 64, and an alternator belt 66.

The alternator 60 may generate a 12 VDC output and may be in electrical communication with a 12 volt battery 70. The battery 70 may be in electrical communication with a converter 80 that may convert 12 VDC power to 110 VAC power to be communicated to the motor 50.

In operation, the electric generating system 10 may be initially powered by the battery 70 power applied to the motor 50 after conversion by converter 80. With electric power applied to the motor 50 to rotate motor pulley 52 and thereby rotate the second pulley 36 to rotate generator shaft 32, the other pulleys in the system will be rotated to turn the rotatable shaft 20 and alternator shaft 64. There May also be a starter motor 100 with a starter shaft 102 and pulley 104 with the pulley engaged with motor belt 54 or alternator belt 66 to aid in initial start up of the inertially aided electric generating system 10.

The motor pulley 52 may be a 20 inch diameter pulley and the second pulley 36 a 1 inch diameter pulley for a 20 to 1 ratio. The motor 50 may cause the generator shaft 32 to rotate at 4,000 rpm at which speed the power to the motor 50 may be interrupted by for example a relay 58, switch or the like. The generator shaft 32 may have a rotational speed sensor 40 in communication as at 42 that may activate the relay 58 to apply or interrupt power to motor 50.

The first pulley 34 may be a 20 inch diameter pulley and the shaft pulley may be a 1 inch diameter pulley for a 20 to 1 ratio. When the generator shaft 32 is rotating at 4,000 rpm, the shaft 20 may be rotating at 80,000 rpm. When electric power may be interrupted to the motor 50, the generator shaft 32 and shaft 20 may continue to rotate due to the rotational inertia of the shaft 20. The shaft 20 may be a balanced, weighted shaft of 250 pounds or other suitable weight for rotational inertia characteristics.

During the rotation of the generator shaft 32 the electric generator may generate electric power. Without motor 50 activated the generator shaft 32 and shaft 20 rotational rate may gradually reduce. When the rotational speed of generator shaft 32 may be reduced to 1000 rpm, the sensor 40 may activate relay 58 to apply power to motor 50, This embodiment is based on the rotational speed of 1,000 rpm being selected as the speed wherein the generator 30 output may be decreasing below 110 VAC. Other generator shaft 32 speeds may also be used to initiate application of power to the motor 50. The motor 50 may then increase the rotational speed of the generator shaft 32 and shaft 20 as previously described. When generator shaft 32 may be rotating at 4,000 rpm, the relay 58 may again interrupt power to the motor 50. Alternatively, the battery 70 and converter 80 may be disconnected by relay 58 and the generator 30 may be connected by relay 58 to power the motor 50 to increase the generator shaft 32 speed to 4,000 rpm. By this system and method the electric generator 30 may supply power to a user over a period of time with the motor 50 being used intermittently to maintain rotational speeds.

There may be fans 90 attached to shafts near the bearings to provide air flow to the bearings. The belts 24, 54 and 66 may have tension pulleys applied to maintain force of the belts on the pulleys.

The alternator 60 may be used to charge the battery 70 when power may be used from the battery 70 to power the motor 50. The third pulley 38 may be a 1 inch diameter pulley and the alternator pulley may be a 4 inch pulley for a 1 to 4 ratio. A rheostat may be used to control the power applied and thereby the speed of motor 50.

A switch 72 that may be controlled by a key may be used to control the operation of the inertially aided electric generating system 10. The switch 72 may control the startup of the system 10 in a startup position to connect the starter motor 100 and motor 50 to the power source or battery 70. When sufficient speed may be established the switch 72 may be moved to a run position for disengaging the starter motor 100 and continuing to power the motor 50 until proper shaft speeds are achieved. The switch 72 may then be moved to a charge position to charge the battery 70 using the alternator 60. In a fourth position the switch 72 may be in a disengaged position where electric power is not applied to the electric generator 30.

The switch 72 may be in communication as at 76 with the relay 58 to control application of power to the motor 50 from the converter 80 or the generator 30. The switch 72 may also be in communication as at 74 with the converter 80 to control application of power to the relay 58 and to control supply of power to an external user. The alternator 60 and battery 70 may be used in combination to supply power to a user using the converter 80 rather than supplying power to the relay 58.

While the invention has been particularly shown and described with respect to the illustrated embodiments thereof, it will be understood by those skilled in the art that the foregoing and other changes in form and details may be made therein without departing from the spirit and scope of the invention.

I claim:

1. A system for generation of electrical energy comprising:
    an electric generator having a rotatable generator shaft with a first pulley attached;
    a rotatable shaft having a shaft pulley attached;
    a shaft belt disposed on said first pulley and said shaft pulley;
    a second pulley attached to said generator shaft;
    a motor having a rotatable motor shaft, said motor shaft having a motor pulley attached;
    a motor belt disposed on said second pulley and said motor pulley; and
    a power source in electrical communication with said motor.

2. The system as in claim 1 wherein said first pulley having approximately a 20 to 1 ratio relative to said shaft pulley.

3. The system as in claim 1 wherein said second pulley having approximately 1 to 20 ratio with said motor pulley.

4. The system as in claim 1 wherein said power source comprising a battery in electrical communication with said motor.

5. The system as in claim 4 further comprising:
    a third pulley attached to said generator shaft;
    an alternator having a rotatable alternator shaft, said alternator shaft having an alternator pulley attached;
    an alternator belt disposed on said third pulley and said alternator pulley; and
    said alternator in electrical communication with said battery.

6. The system as in claim 5 wherein said motor is a 110 VAC motor, said battery is a 12 VDC battery and a converter is in electrical communication intermediate said battery and said motor to convert 12 VDC power to 110 VAC power.

7. The system as in claim 5 wherein said motor belt and said alternator belt each having a tension pulley applied thereto.

8. The system as in claim 5 wherein a starter motor having a starter shaft with a starter pulley attached wherein said starter pulley engaged with said alternator belt and said starter motor in electrical communication with said power source.

9. The system as in claim 5 wherein said electric generator is in electrical communication with said relay and a switch is in communication with said relay to control application of power to said motor.

10. The system as in claim 5 wherein a switch is in communication with said converter to control application of power to an external user.

11. The system as in claim 1 wherein a speed sensor sensing the speed of said generator shaft is in communication with a relay to apply and interrupt power from said power source to said motor.

12. The system as in claim 11 wherein said sensor programmed to apply power to said motor when the speed of said generator shaft is approximately less than 1,000 rpm and to interrupt power to said motor when the speed of said generator shaft is approximately greater than 4,000 rpm.

13. The system as in claim 1 wherein said generator shaft and said rotatable shaft each rotating in a bearing having a fan mounted adjacent thereto.

14. The system as in claim 1 wherein a starter motor having a starter shaft with a starter pulley attached wherein said starter pulley engaged with said motor belt and said starter motor in electrical communication with said power source.

15. A system for generation of electrical energy comprising:
    an electrical generator having a rotatable generator shaft with a first, pulley attached;
    a rotatable shaft having a shaft pulley attached;
    said first pulley and said shaft pulley having approximately a 20 to 1 ration therebetween and a shaft belt disposed on said first pulley and said shaft pulley;
    a second pulley attached to said generator shaft;
    a motor having a rotatable motor shaft with a motor pulley attached;
    said second pulley and said motor pulley having approximately a 1 to 20 ratio therebetween and a motor belt disposed on said second pulley and said motor pulley;
    a third pulley attached to said generator shaft;
    an alternator having a rotatable alternator shaft with an alternator pulley attached;
    said third pulley and said alternator pulley having approximately a 1 to 4 ratio therebetween and an alternator belt disposed on said third pulley and said alternator pulley; and
    said alternator in electrical communication with a battery and said battery in electrical communication with said motor.

16. The system as in claim 15 wherein said motor is a 110 VAC motor, said battery is a 12 VDC battery and a converter is in electrical communication intermediate said battery and said motor to convert 12 VDC power to 110 VAC power.

17. The system as in claim 15 wherein a speed sensor sensing the speed of said generator shaft is programmed to control a relay to apply power to said motor when the speed of said generator shaft is approximately less than 1,000 rpm and to interrupt power to said motor when the speed of said generator shaft is approximately greater than 4,000 rpm.

18. The system as in claim 15 wherein said shaft belt, said motor belt and said alternator belt each having a tension pulley applied thereto.

19. The system as in claim 15 wherein said electric generator is in electrical communication with said relay and a switch is in communication with said relay to control application of power to said motor.

* * * * *